US011086491B1

(12) United States Patent
Liu et al.

(10) Patent No.: US 11,086,491 B1
(45) Date of Patent: Aug. 10, 2021

(54) SYSTEMS AND METHODS FOR DISPLAYING VIDEO STREAMS ON A DISPLAY

(71) Applicant: Honeywell International Inc., Morris Plains, NJ (US)

(72) Inventors: Dongyun Liu, Shanghai (CN); Fujuan Ji, Shanghai (CN); Jun Zhao, QingTongXia (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/748,214

(22) Filed: Jan. 21, 2020

(51) Int. Cl.
*G06F 3/0484* (2013.01)
*H04N 7/18* (2006.01)
*G06F 3/0482* (2013.01)
*G06F 3/0481* (2013.01)

(52) U.S. Cl.
CPC .......... *G06F 3/0484* (2013.01); *G06F 3/0482* (2013.01); *G06F 3/04817* (2013.01); *H04N 7/181* (2013.01)

(58) Field of Classification Search
CPC .. G06F 3/0484; G06F 3/04817; G06F 3/0482; H04N 7/18; H04N 7/181; G08B 13/19645; G08B 13/19641
See application file for complete search history.

(56) References Cited

U.S. PATENT DOCUMENTS

| 6,167,316 | A | 12/2000 | Gloudeman et al. |
| 6,965,376 | B2 | 11/2005 | Tani et al. |
| 7,567,844 | B2 | 7/2009 | Thomas et al. |
| 7,587,274 | B2 | 9/2009 | Kaldewey et al. |
| 7,693,042 | B1 | 4/2010 | Wei |
| 7,861,180 | B2 | 12/2010 | Liu et al. |
| 7,895,599 | B2 | 2/2011 | Muscarella |
| 7,899,777 | B2 | 3/2011 | Baier et al. |

(Continued)

FOREIGN PATENT DOCUMENTS

| CN | 103793042 | 5/2014 |
| DE | 202012002010 | 7/2012 |
| FR | 3001098 | 7/2014 |

OTHER PUBLICATIONS

International Search Report Cited in PCT Application Serial No. PCT/IB2014/061964, completed Sep. 22, 2014.

(Continued)

*Primary Examiner* — Mong-Shune Chung
(74) *Attorney, Agent, or Firm* — Seager, Tufte & Wickhem, LLP

(57) ABSTRACT

Methods and systems may be configured to facilitate displaying video on a display. The video may be video from cameras of a surveillance system providing surveillance of one or more predetermined areas. The predetermined area may be mapped and icons may be placed on an electronic map of the predetermined area to represent locations of the cameras in the predetermined area. The icons may be selected and in response to selection of the icons, video from a camera associated with the selected icon may be displayed. When video from multiple cameras is to be displayed concurrently, pop-up windows providing the video may overlap. The methods and systems may include adjusting the location of the pop-up windows providing the video to avoid overlapping video streams.

19 Claims, 9 Drawing Sheets

(56) References Cited

U.S. PATENT DOCUMENTS

| | | | |
|---|---|---|---|
| 7,900,215 B2 | 3/2011 | Engber et al. | |
| 7,904,209 B2 | 3/2011 | Podgorny et al. | |
| 7,908,560 B2 | 3/2011 | Balfe et al. | |
| 7,954,070 B2 | 5/2011 | Plocher et al. | |
| 7,971,151 B2 | 6/2011 | Nixon et al. | |
| 8,036,872 B2 | 10/2011 | Nasle et al. | |
| 8,233,008 B2 | 7/2012 | Jin et al. | |
| 8,269,729 B2 | 9/2012 | Han et al. | |
| 8,270,767 B2 | 9/2012 | Park | |
| 8,302,029 B2 | 10/2012 | Makela | |
| 8,352,176 B2 | 1/2013 | Kaldewey et al. | |
| 8,434,029 B2 | 4/2013 | Albright | |
| 8,464,181 B1 | 6/2013 | Baillang et al. | |
| 8,490,025 B2 | 7/2013 | Jakobson et al. | |
| 8,532,962 B2 | 9/2013 | Zhang et al. | |
| 8,584,030 B2 | 11/2013 | Laycock et al. | |
| 8,615,396 B2 | 12/2013 | Grigsby et al. | |
| 8,671,355 B2 | 3/2014 | Pegg et al. | |
| 8,681,153 B2 | 3/2014 | Houllier et al. | |
| 8,712,192 B2 | 4/2014 | Thota | |
| 8,775,068 B2 | 7/2014 | Pylappan | |
| 8,791,912 B2 | 7/2014 | Chen et al. | |
| 8,918,413 B2 | 12/2014 | Hiestermann et al. | |
| 8,928,657 B2 | 1/2015 | Bailiang | |
| 8,981,413 B2 | 3/2015 | Obika | |
| 9,063,739 B2 | 6/2015 | Ward et al. | |
| 9,996,237 B2 | 6/2018 | Van Dijkman et al. | |
| 10,365,260 B2 | 7/2019 | Amaravadi | |
| 2002/0018123 A1 | 2/2002 | Suzuki et al. | |
| 2003/0078677 A1 | 4/2003 | Hull et al. | |
| 2004/0051739 A1 | 3/2004 | Schmickley et al. | |
| 2004/0254963 A1 | 12/2004 | Bradley et al. | |
| 2006/0090141 A1 | 4/2006 | Loui et al. | |
| 2006/0109113 A1 | 5/2006 | Reyes et al. | |
| 2007/0055757 A1 | 3/2007 | Mairs et al. | |
| 2007/0101383 A1 | 5/2007 | MacIntosh et al. | |
| 2007/0288863 A1* | 12/2007 | Ording | G06F 3/04847 715/788 |
| 2008/0222565 A1 | 9/2008 | Taylor et al. | |
| 2009/0100363 A1 | 4/2009 | Pegg et al. | |
| 2009/0225164 A1* | 9/2009 | Renkis | H04N 5/232933 348/143 |
| 2011/0013018 A1 | 1/2011 | Leblond | |
| 2011/0087988 A1 | 4/2011 | Ray et al. | |
| 2011/0161875 A1 | 6/2011 | Kankainen | |
| 2011/0187864 A1 | 8/2011 | Snider | |
| 2011/0187865 A1 | 8/2011 | Felt et al. | |
| 2011/0214050 A1 | 9/2011 | Stambaugh | |
| 2011/0225541 A1 | 9/2011 | Ramos | |
| 2011/0261202 A1 | 10/2011 | Goldstein | |
| 2012/0017168 A1 | 1/2012 | Mason et al. | |
| 2012/0059818 A1 | 3/2012 | Phang et al. | |
| 2012/0072052 A1 | 3/2012 | Powers et al. | |
| 2012/0158185 A1 | 6/2012 | El-Mankabady et al. | |
| 2012/0179742 A1 | 7/2012 | Acharya et al. | |
| 2012/0194336 A1 | 8/2012 | Thiruvengada et al. | |
| 2012/0197524 A1 | 8/2012 | Beyeler et al. | |
| 2012/0317507 A1 | 12/2012 | Gutierrez et al. | |
| 2013/0002880 A1 | 1/2013 | Levinson et al. | |
| 2013/0036356 A1 | 2/2013 | Worrill et al. | |
| 2013/0041486 A1 | 2/2013 | Lee et al. | |
| 2013/0083012 A1 | 4/2013 | Han et al. | |
| 2013/0083035 A1 | 4/2013 | Han et al. | |
| 2013/0083055 A1 | 4/2013 | Pemonte et al. | |
| 2013/0205257 A1 | 8/2013 | Albright | |
| 2013/0208124 A1 | 8/2013 | Boghossian et al. | |
| 2013/0249812 A1 | 9/2013 | Ramos et al. | |
| 2013/0321401 A1 | 12/2013 | Piemonte et al. | |
| 2014/0007017 A1 | 1/2014 | Sternfeld et al. | |
| 2014/0013263 A1 | 1/2014 | Bailiang et al. | |
| 2014/0047366 A1 | 2/2014 | Pegg et al. | |
| 2014/0096045 A1 | 4/2014 | Dobryanskaya et al. | |
| 2014/0136701 A1 | 5/2014 | Billau et al. | |
| 2014/0137017 A1 | 5/2014 | Sharma et al. | |
| 2014/0152698 A1 | 6/2014 | Kim et al. | |
| 2014/0172184 A1 | 6/2014 | Schmidt et al. | |
| 2014/0211027 A1 | 7/2014 | Worrill et al. | |
| 2014/0223360 A1 | 8/2014 | Bailiang | |
| 2014/0245232 A1 | 8/2014 | Bailiang | |
| 2014/0253538 A1 | 9/2014 | Bailiang et al. | |
| 2014/0362112 A1 | 12/2014 | Morrison et al. | |
| 2014/0365891 A1 | 12/2014 | Morrison et al. | |
| 2014/0365896 A1* | 12/2014 | Morrison | G06F 3/0485 715/728 |
| 2014/0365942 A1 | 12/2014 | Morrison et al. | |
| 2014/0365976 A1 | 12/2014 | Morrison et al. | |
| 2014/0365980 A1 | 12/2014 | Morrison et al. | |
| 2015/0324107 A1* | 11/2015 | Van Dijkman | G06F 3/04883 715/719 |
| 2016/0337620 A1* | 11/2016 | Horovitz | G06F 3/04817 |

OTHER PUBLICATIONS

Written Opinion of the International Searching Authority Cited in PCT Application Serial No. PCT/IB2014/061964, completed Sep. 22, 2014.

\* cited by examiner

SYSTEMS AND METHODS FOR DISPLAYING VIDEO STREAMS ON A DISPLAY

TECHNICAL FIELD

This disclosure relates generally to monitoring video streams, and more particularly to systems and methods for concurrently displaying video streams on an operator's display.

BACKGROUND

Security, surveillance and other applications often utilize video streams captured by a plurality of video cameras distributed about a designated area. In many cases, an operator at a monitoring station can select which of the video streams to view by selecting corresponding video cameras. In some cases, video camera icons are placed at locations on a map that correspond to the physical location of the video cameras, and the operator may simply select desired video camera icons to view the corresponding video streams. The video streams are often displayed in a pop-up window that pops-up at or near the location on the map of the corresponding video camera icon. A limitation of this approach is that when the operator selects two or more video camera icons that are in close proximity to one another on the map, the pop-up windows often overlap one another, thereby making it difficult for the operator to concurrently monitor the video streams from all of the selected video cameras.

SUMMARY

This disclosure relates generally to monitoring video streams, and more particularly to systems and methods for concurrently displaying video streams on an operator's display.

In one example, a method of and computer readable medium for displaying video on a display is provided. The method may include displaying a map of a predetermined area on a display. The map may include a plurality of icons, where each icon of the plurality of icons represents a corresponding video camera in the predetermined area. Each icon of the plurality of icons may be positioned at a map location that corresponds to a physical location of the corresponding video camera in the predetermined area. The method may further include receiving a selection by a user of two or more of the plurality of icons and in response to receiving the selection by the user of the two or more of the plurality of icons, displaying a pop-up video stream window on the display for each of the selected two or more icons. In some cases, each of the pop-up video stream windows displays a video stream of the corresponding video camera. When two or more of the pop-up video stream windows would otherwise overlap another on the display, two or more of the video streams may be grouped into a single grouped pop-up video stream window. This may avoid the video streams from overlapping one another and allowing an operator to concurrently monitor the video streams.

In another example, a video monitoring system is provided. The video monitoring system may include a display, a processor in communication with the display, and memory configured to store instructions executable by the processor. The processor may be configured to receive video streams from two or more video cameras. The instructions executable by the processor and stored on the memory may cause the processor to: display a map of a predetermined area, where the map includes icons indicating locations of the two or more video cameras in the predetermined area; display the video streams received from the two or more video cameras in video stream windows on the display; and ensure the video stream windows displayed on the display avoid overlap.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
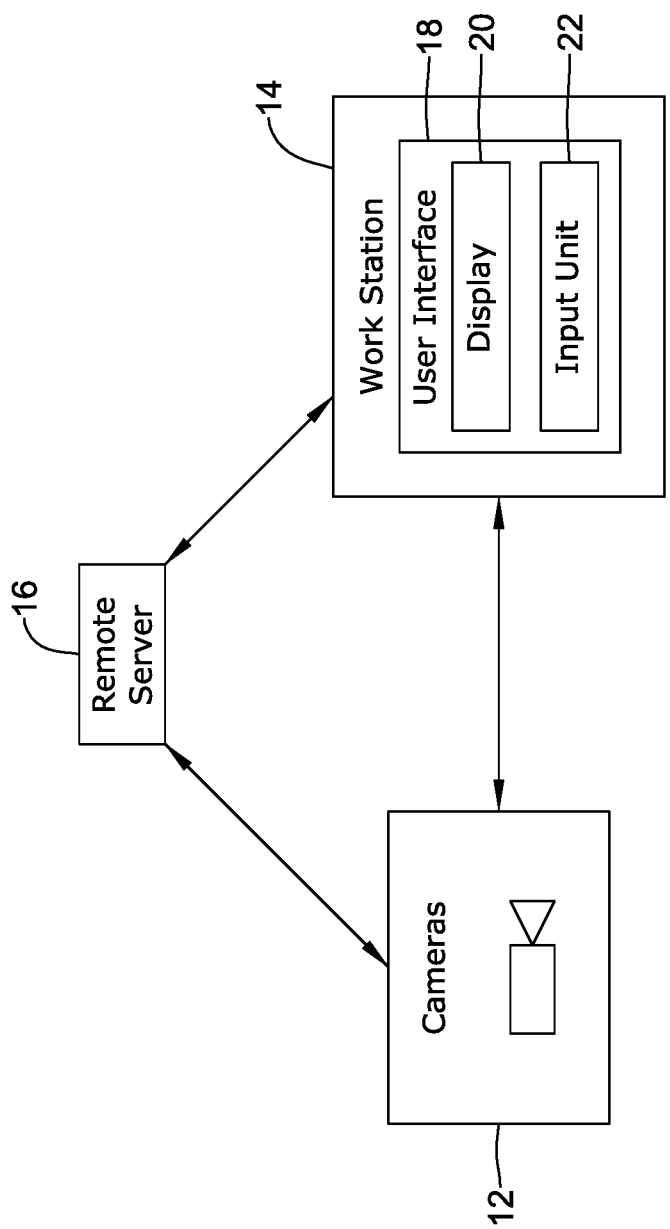
FIG. 1 is a schematic diagram of an illustrative monitoring system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

Building automation systems may include one or more building automation devices installed in one or more buildings. In some cases, the building automation devices may be installed at an installation site and a location of the installed building automation devices may be mapped on a map of the building or buildings in which the building automation devices are installed.

When the building automation devices are mapped on the map of a building or buildings, the building automation devices may be represented by an icon on the map. In some cases, selection of the icon representing a building automation device on the map displayed on a display may result in a pop-up window overlaying the map that provide data and/or information related to the building automation device associated with the icon. When two or more of the icons are selected, the pop-up windows may overlap one another and hide some of the data or information intended to be displayed and thus, limit the ability to display data and/or information of building automation devices located near one another in a building.

Building automation devices may include any suitable building automation devices configured to facilitate automation of one or more building-related functions. Building automation devices may include, but are not limited to, a light controller, a thermostat, surveillance system components, heating, ventilation, and air conditioning (HVAC) components, security system components, fire protection components, etc. Building automation devices may be monitored in one or more manners, including via a display at a monitoring station (e.g. workstation). For example, video captured by cameras of a security system may be monitored via one or more displays at a monitoring station. Although the monitoring discussed herein primarily refers to monitoring video streams from cameras of a surveillance system and/or security system that have been installed in a building, the monitoring may be applied to monitoring other suitable building automation devices (e.g. HVAC controller) deployed at one or more predetermined locations in or around a building or other area.

FIG. 1 schematically depicts an illustrative system 10 useful for monitoring one or more video streams from one or more cameras 12 (e.g., building automation devices) of a surveillance, security and/or other system. Although not required, the system 10 may be part of the surveillance and/or security system. The cameras 12 may be configured to connect over a network to one or more work stations 14. Further, the cameras 12 and/or the work station 14 may be configured to connect to one or more remote servers 16 over a network. In some cases, the cameras 12, the work station(s) 14, and the remote server(s) 16 may be connected to a local area network (LAN) and/or a wide area network (WAN) (e.g., the Internet). The cameras 12, the work stations 14, and the remote servers 16 may communicate over the networks to facilitate monitoring video feeds or streams from the camera 12, to pass data from cameras 12 to the work stations 14 and/or the remote servers 16, provide software updates from the remove server 16 to the cameras 12 and/or the work station 14, provide control instructions/signals from the work station 14 and/or the remote server 16, and/or communicate other suitable data, instructions, and/or information among the cameras 12, the work stations 14, and the remote server 16.

The cameras 12 may be any suitable type of image and/or video capturing cameras configured to capture video of a predetermined area. In some cases, one or more of the cameras 12 may be pan-tilt-zoom (PTZ) cameras, still cameras, 360 degree-view cameras, and/or other cameras 12 suitable for surveillance purposes and/or other suitable purposes. In some cases, one or more cameras 12 may be or may include a computing device configured to facilitate capturing video of the predetermined area and/or monitoring captured video.

The work station 14 may be any suitable work station configured to facilitate interacting with the cameras 12 and/or the remote servers 16, monitoring of the cameras 12, and/or monitoring other suitable building automation devices. In some cases, the work station 14 may include a user interface 18. The user interface 18 may include, among other features, a display 20 for displaying 20 video streams from the cameras 12 and/or to facilitate a user interacting with the work station 14 and/or monitoring the cameras 12. Further, in some cases, the user interface 18 may include an input unit 22 for receiving selections from a user and/or other interactions from a user. The input unit 22 may be and/or may include one or more of a touch-screen component of the display, buttons associated with the display 20, a mouse, a touch pad, a keyboard, a stylus, a motion detector, a camera, and/or other suitable components configured to facilitate providing inputs to the work station 14.

The remote server 16 may be any suitable type of server configured to communicate with the cameras 12 and/or the work station 14. The remote server 16 may be located in a same or different building than one or more of the cameras 12 and/or the work stations 14. The remote server 16 may be considered remote in that it may connect over a wired or wireless network to one or more of the cameras 12 and/or the work stations 14.

The remote server 16 may be configured to receive captured video from the cameras 12 and store the received video in memory. The remote server 16 may be configured to send received and/or stored video to the work station 14 upon a request from the work station 14 and/or facilitate the work station 14 receiving video associated with the cameras 12.

The cameras 12, the work stations 14, and the remote servers 16 may be and/or may include one or more computing devices having a processor, memory, an input/output (I/O) unit (e.g., which may include a communications unit), and/or other suitable components. In some cases, the computing devices of the or in the system 10 may be or may include one or more of a thick client (e.g., a computing device and associated hardware) and/or a thin client (e.g. web browser). Example thick clients include, but are not limited to, a personal computer, a mobile phone, a tablet computer, a laptop computer, a server, etc. Example thin clients may include, but are not limited to, a web client (e.g., a web-based client having a website interface to communicate with the cameras 12, the work stations 14, the remote servers 16, and/or a mobile application (app) (e.g., a mobile app having an interface to communicate with the cameras 12, the work stations 14, and/or the remote servers 16), etc. In one example of a thin client, the thin client may facilitate a user accessing his/her user account associated with monitoring the cameras through interactions with a user interface of a computing device.

Figure 2:
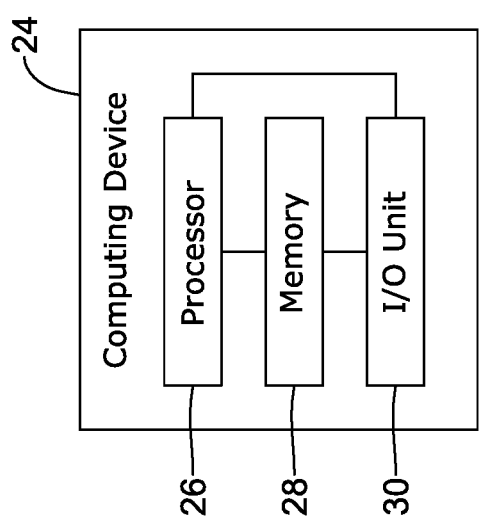
FIG. 2 is a schematic diagram of an illustrative computing device.

FIG. 2 depicts a schematic block diagram of an illustrative computing device 24, the components of which may be incorporated in and/or utilized by one or more components of the system 10 including, but not limited to the cameras 12, the work stations 14, the remote servers 16, and/or other computing device components discussed herein. The components of the system 10 may include or otherwise utilize one or more computing devices 24 to communicate with one another, store data related to one another, and/or store data related to the components of the system 10. Other examples uses of the computing devices 24 are contemplated. The illustrative computing device 24 may include, among other suitable components, a processor 26, memory 28, and an I/O unit 30.

The processor 26 of the computing device 24 may include a single processor or more than one processor working individually or with one another (e.g., dual-core, etc.). The processor 26 may be configured to execute instructions, including instructions that may be loaded into the memory 28 and/or other suitable memory. Example processor components may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 28 of the computing device 24 may include a single memory component or more than one memory component each working individually or with one another. Example types of memory 28 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 28 may be or may include a non-transitory computer readable medium.

The I/O units 30 of the computing device 24 may include a single I/O component or more than one I/O component each working individually or with one another. Example I/O units 30 may be any type of communication port configured to communicate with other components of the system 10. Example types of I/O units 30 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

Locations of cameras of a surveillance system in a predetermined area may be represented on a map of the predetermined area with a corresponding icon. When the map is presented electronically to a user (e.g. via a display), the icons representing cameras may be selected to display images and/or video captured by cameras represented by selected icons and/or other suitable information and data related to the camera represented by the selected icon(s). A user may select icons with any suitable input unit or component (e.g., input unit 22 and/or other suitable input unit).

Figure 3:
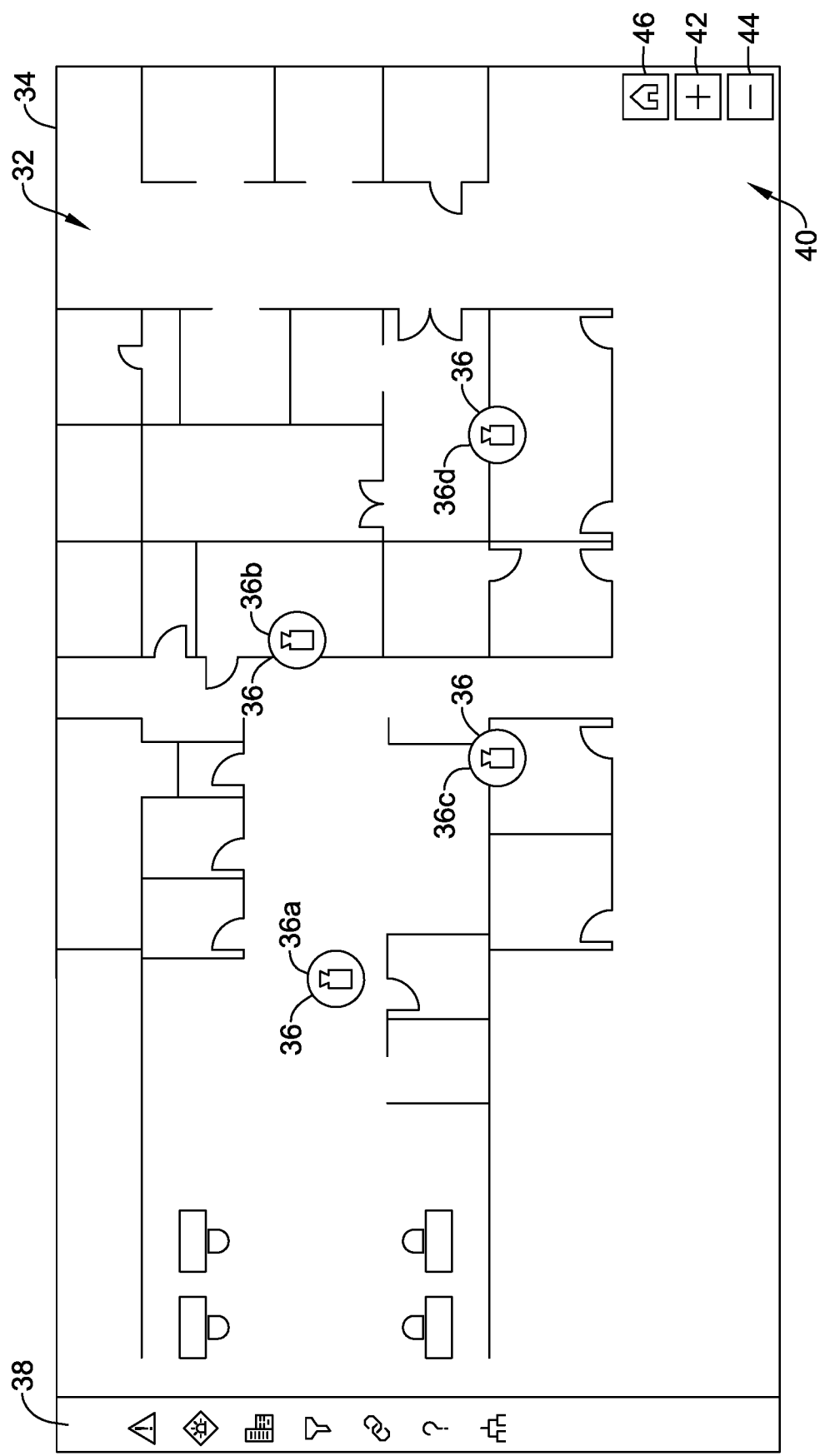
FIG. 3 is a schematic diagram of an illustrative display depicting a map with locations of building automation devices each marked with a corresponding icon.

FIG. 3 depicts an illustrative map 32 on an electronic screen 34 of a display (e.g., the display 20 and/or other suitable display), where the map depicts a layout of a floor or a portion of a floor of a building along with camera icons 36 representing physical locations of cameras 12 on the depicted floor or portion of a floor. There are four camera icons 36 depicted in FIG. 3 including a first camera icon 36*a*, a second camera icon 36*b*, a third camera icon 36*c* and a fourth camera icon 36*d*. Although four camera icons 36 are depicted in FIG. 3, other suitable numbers of camera icons may be depicted on the map 32. Further, although the camera icons 36 may be numbered, the numbers used herein (e.g., first, second, third, fourth) are used for convenience and clarity and any camera icon 36 may be given any suitable number or designation.

As shown in FIG. 3, the electronic screen 34 has a selection bar 38 providing icons that may be selectable to view further information and/or perform an action with respect to the map 32, the surveillance system, and/or the building(s) associated with the surveillance system. Further, the electronic screen 34 may have a zoom control icons 40, which may be selected to adjust a zoom level of the map 32. The zoom control icons 40 may include a zoom-in icon 42 (e.g., represented by a "+" icon in FIG. 3), a zoom-out icon 44 (e.g., represented by a "−" icon in FIG. 3), and a zoom return icon 46 (e.g., represented by a house icon in FIG. 3) that returns a zoom level to a predetermined level after zooming in or zooming out. Additional or alternative, zoom control icons may be utilized, as desired.

As discussed above, it may be possible to select one or more of the camera icons 36 to view images, video, and/or other suitable information related to the cameras associated with the selected camera icons. In one example, in response to selecting each of camera icons 36*a*, 26*c* and 36*d*, a corresponding pop-up window 48*a*, 48*c* and 48*d* (e.g., see FIG. 4) may be provided on the electronic screen 34. In some cases, the pop-up windows 48*a*, 48*c* and 48*d* may be video stream window that pops-up on the screen 34 and provides live video or video replay of video from the cameras 12 associated with the selected camera icons 36*a*, 26*c* and 36*d*, respectively. The video may be received directly from the cameras 12 associated with the selected camera icons 36*a*, 26*c* and 36*d*, from a server (e.g., the remove server 16 and/or other suitable server), and/or from one or more computing device 24 of or communication with the work station 14.

Figure 4:
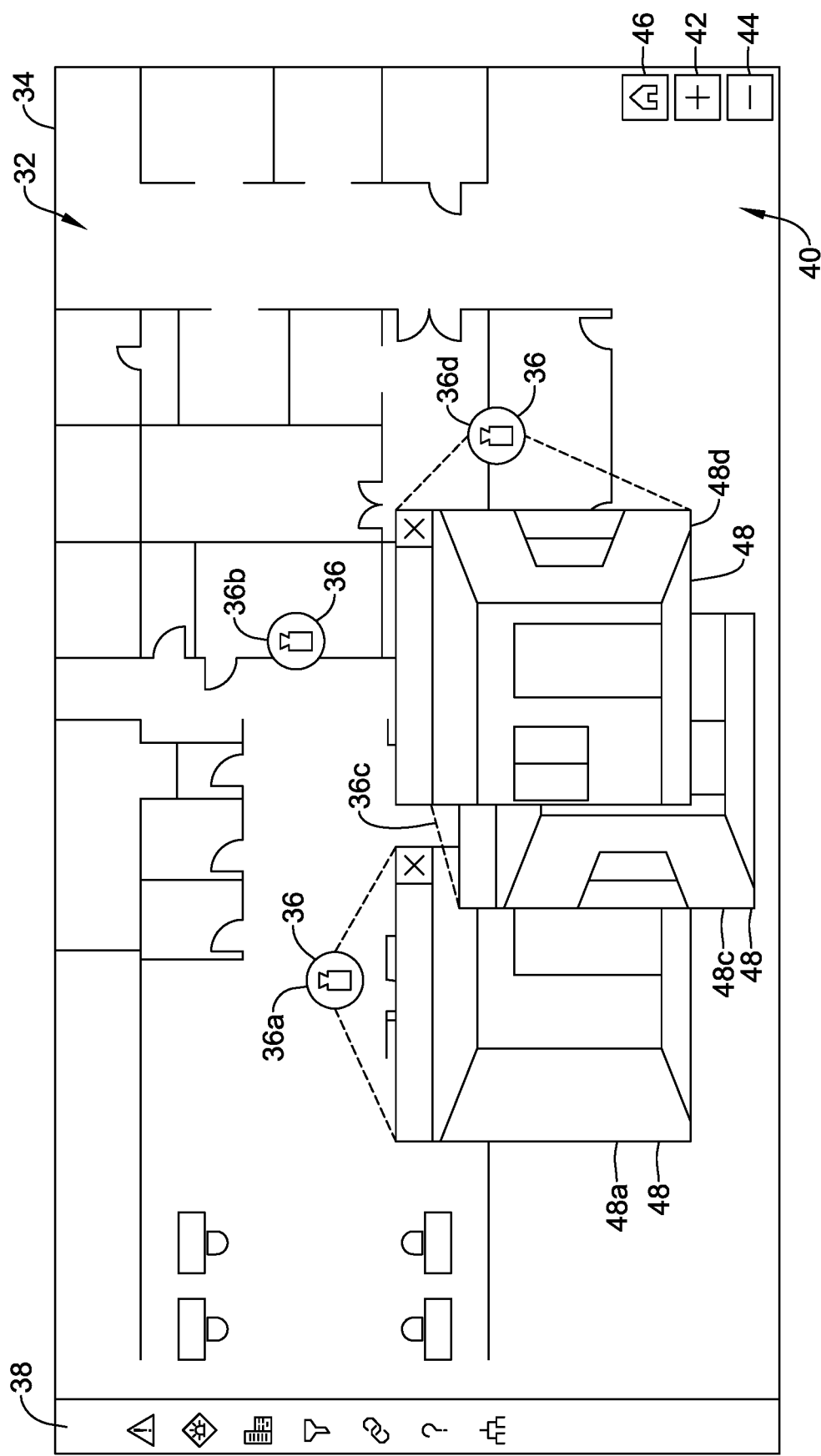
FIG. 4 is a schematic diagram of an illustrative display depicting a map with locations of building automation devices each marked with a corresponding icon, and pop-up windows associated with certain of the icons.

FIG. 4 depicts the map 32 and camera icons 36 at a similar zoom level to that depicted in FIG. 3, where the first camera icon 36*a* has been selected causing a first pop-up window 48*a* to be displayed, the third camera icon 36*c* (e.g., as represented by a broken line due to the third camera icon being covered by a pop-up window 48) has been selected causing a second pop-up window 48*c* to be displayed, and the fourth camera icon 36*d* has been selected causing a third pop-up window 48*d* to be displayed. Although three pop-up windows 48*a*, 48*c* and 48*d* are displayed, any suitable number of pop-up windows 48 may be displayed on the electronic screen 34. Broken lines are provided between the pop-up windows 48 and an associated selected camera icon 36 to indicate with which selected camera icon 36 the pop-up window 48 is associated. Additionally or alternatively, other suitable mechanisms (e.g., synced labels on the selected camera icons 36 and/or the pop-up windows 48, shadow lines between the selected camera icons 36 and the pop-up windows 48, solid lines between the selected camera icons 36 and the pop-up windows 48, etc.) or no mechanisms may be used to associate pop-up windows 48 with selected camera icons 36. Further, although the pop-up windows 48 may be numbered, the numbers used herein (e.g., first, second, third) are used for convenience and clarity and any pop-up window 48 may be given any suitable number or other designation.

The three pop-up windows 48*a*, 48*c* and 48*d* that are displayed in FIG. 4 may each be configured to play a corresponding video feed concurrently. Alternatively, the pop-up windows 48*d* may only be playing video because it was the latest pop-up window 48*d* to be activated and is on top of the other pop-up windows 48*a* and 48*d*. Further, the playing of video in the pop-up windows 48 may be adjusted via typical video playback controls on or in communication with the electronic screen 34 (e.g., in the pop-up windows 48 and/or at other suitable locations on or in communication with the electronic screen 34).

As depicted in the FIG. 4, the pop-up windows 48 (e.g., the first pop-up window 48a, the second pop-up window 48c, and the third pop-up window 48d) associated with the selected camera icons 36 (e.g., the first camera icon 36a, the third camera icon 36c, and the fourth camera icon 36d) may overlap with one another on the electronic screen 34, particularly when cameras 12 associated with the particular selected camera icons 36 are in close proximity to one another. Such overlap of the pop-up windows 48 may result in making it difficult for an operator to view video from the selected cameras concurrently, which may be problematic when the operator is trying to understand a scene captured by multiple cameras, when the operator is trying to track an object through multiple scenes captured by multiple cameras and/or under other scenarios.

Figure 5:
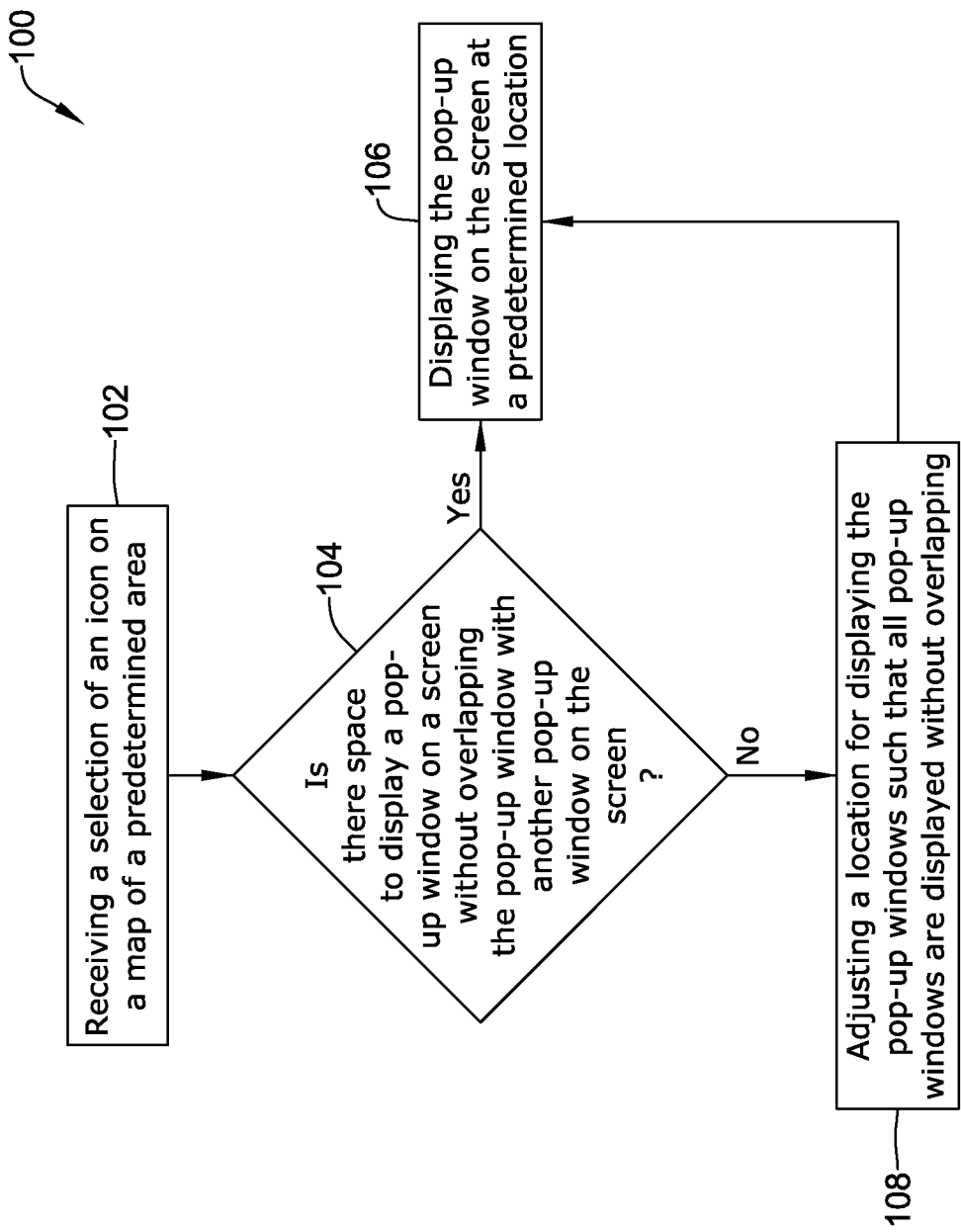
FIG. 5 is a schematic flow diagram of an illustrative method for displaying pop-up windows without overlapping the pop-up windows.

FIG. 5 is a schematic flow diagram of an illustrative method 100 for displaying pop-up windows (e.g., the pop-up windows 48 and/or other suitable pop-up windows) on an electronic screen (e.g., the electronic screen 34 and/or one or more other suitable electronic screens) displaying a map (e.g., the map 32 and/or other suitable map). The method 100 may facilitate pop-up windows that are displayed on the electronic screen in response to selection of two or more icons (e.g., the camera icons 36 and/or other suitable icons) from overlapping one another (e.g., avoid overlap). One or more steps of the method 100 may be performed automatically by a computing device to help avoid pop-up windows from overlapping one another.

The illustrative method 100 may include receiving 102 a selection of an icon on a map of a predetermined area. Further, receiving 102 the selection of an icon on a map of a predetermined area may include receiving a selection of two or more of the plurality of icons at one time and/or a selection of two or more of the plurality of icons individually over time. In some cases, each of the icons may represent a camera (e.g., the camera 12 and/or other suitable camera) and the icons may be selected to cause a corresponding pop-up window to be displayed on the electronic screen that provides a video feed from the camera associated with the selected icon.

The method 100 may include determining 104 if there is enough display space on the electronic screen to display a pop-up window for the selected icon without overlapping other pop-up windows. In some cases, the pop-up windows displayed in response to selecting an icon may be displayed at predetermined locations on the electronic screen relative to the corresponding icon, but this is not required. When the pop-up window is to be displayed at a predetermined location on the electronic screen relative to the corresponding icon, the determining 104 potential overlap may include determining whether there would be overlap of the pop-up window with another pop-up window at the predetermined location relative to the corresponding icon. The predetermined location may be a specific single location on the electronic screen relative to the corresponding icon, a specific location on the electronic screen within a radius or distance from the selected icon, etc.

Determining whether the pop-up window associated with the selected icon will overlap with another pop-up window may be determined in any suitable manner. In one example, a number of pop-up windows to be displayed (e.g., in response to selections of a number of icons) on the electronic screen may be compared to a threshold number of pop-up windows for the electronic display. If the number of pop-up windows to be displayed reaches or goes beyond the threshold number of pop-up windows for the electronic screen, it may be determined that two or more pop-up windows would necessarily overlap if all of the pop-up windows to be displayed were displayed on the electronic screen. The threshold number of pop-up windows may be any suitable number of pop-up windows. In one example, the threshold number of pop-up windows may be two, three, four, five, ten, and/or other suitable number of pop-up windows.

Although not required, the threshold number of pop-up windows may be a function of a zoom level of the map on the electronic screen. For example, when zoomed-in from an initial zoom level, the threshold number of pop-up windows may be greater than the threshold number of pop-up windows when zoomed-out from the initial zoom level. Alternatively or additionally, the threshold number of pop-up windows may be predetermined and/or may be established in one or more other suitable manners.

In another example technique for determining whether the pop-up window associated with a selected icon will overlap with another pop-up window, it may be determined whether two or more pop-up windows displayed and/or to-be displayed would have a threshold number of pixels that overlap. When two or more pop-up windows displayed and/or to-be displayed would have a threshold number of pixels that overlap, it may be determined that the displayed or to-be displayed pop-up windows would overlap. When two or more pop-up windows displayed and/or to-be displayed would not have a threshold number of pixels that overlap, it may be determined that the displayed or to-be displayed pop-up windows would not overlap. The threshold number of pixels may be any suitable number of pixels. In one example, the threshold number of pixels may be one pixel, but this is not required and other suitable numbers of pixels greater than one may be utilized.

In some cases, and although not required, the threshold number of pixels may be a function of a zoom level of the map on the electronic screen. For example, when zoomed-in from an initial zoom level, the threshold number of pixels may be greater than the threshold number of pixels when zoomed-out from the initial zoom level. Alternatively or additionally, the threshold number of pixels may be predetermined and/or may be established in one or more other suitable manners.

When there is space to display the pop-up window without overlap with another pop-up window, the pop-up window associated with a selected icon may be displayed 106 on the electronic screen (e.g. at a predetermined location relative to the selected icon and/or at one or more other suitable locations that prevent overlap), along with any other already displayed pop-up windows associated with previously selected icons. When it is determined the pop-up window associated with a selected icon will overlap with another pop-up window already displayed on the electronic screen, one or more of the pop-up windows already displayed on the electronic screen and/or the pop-up window associated with the selected icon may have a location adjusted 108 from a respective predetermined location. In some cases, only a location of the pop-up window associated with the currently selected icon may be adjusted. Alternatively or addition, locations of one or more of the pop-up windows already displayed on the electronic screen may be adjusted or modified. Further, in some cases, adjusting 108 locations of one or more pop-up windows may include combining video streams from two or more pop-up windows into a single grouped pop-up window, while allowing for simultaneous viewing of the video streams combined into a single pop-up window. The combining of video streams from two or more pop-up windows into the single grouped pop-up window may be performed with or without otherwise adjusting pre-determined locations of the pop-up windows. Although not required, the adjusting locations of one or more pop-up windows may be performed automatically in response to detecting two or more pop-up windows will overlap. Further, the steps of method 100 may be repeated each time a selection of an icon is received and/or at other times.

Figure 6:
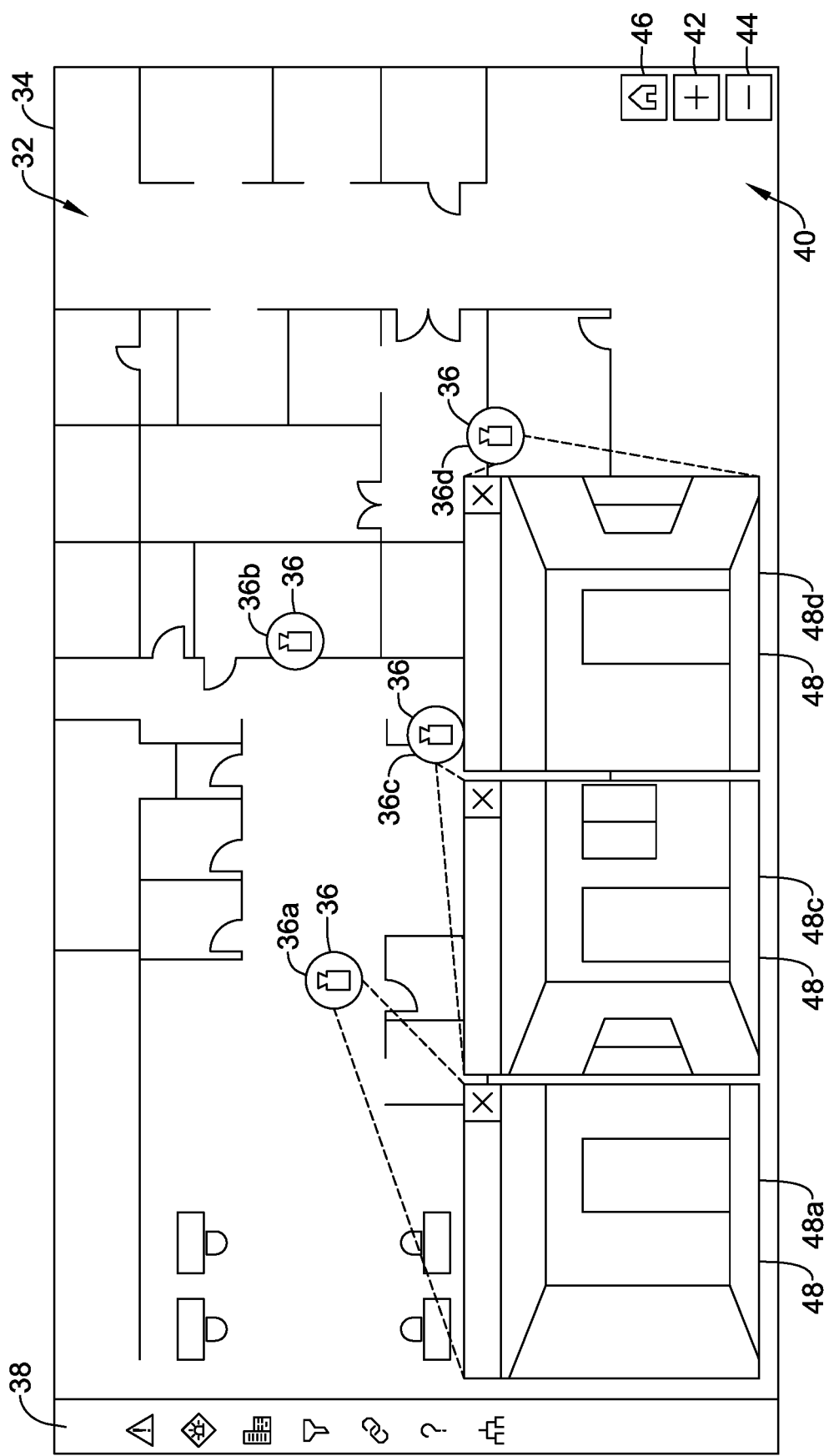
FIG. 6 is a schematic diagram of an illustrative display depicting a map with locations of building automation devices each marked with a corresponding icon, and pop-up windows associated with certain of the icons.

FIG. 6 depicts the map 32 and camera icons 36 at a similar zoom level to that depicted in FIG. 4, where locations of the first pop-up window 48a associated with the first camera icon 36a, the second pop-up window 48c associated with the third camera icon 36c, and the third pop-up window 48d associated with the fourth camera icon 36d have been adjusted such that all of the pop-up windows 48 displayed on the electronic screen 34 are displayed without any of the pop-up windows 48 overlapping one another. Although locations of all three pop-up windows 48 displayed on the electronic screen 34 have been adjusted from predetermined locations relative to their corresponding camera icons 36 depicted in FIG. 4, it may be possible to adjust locations of only one or more pop-up windows 48 to get all of the pop-up windows displayed on the electronic screen 34 to not overlap with one another.

Figure 7:
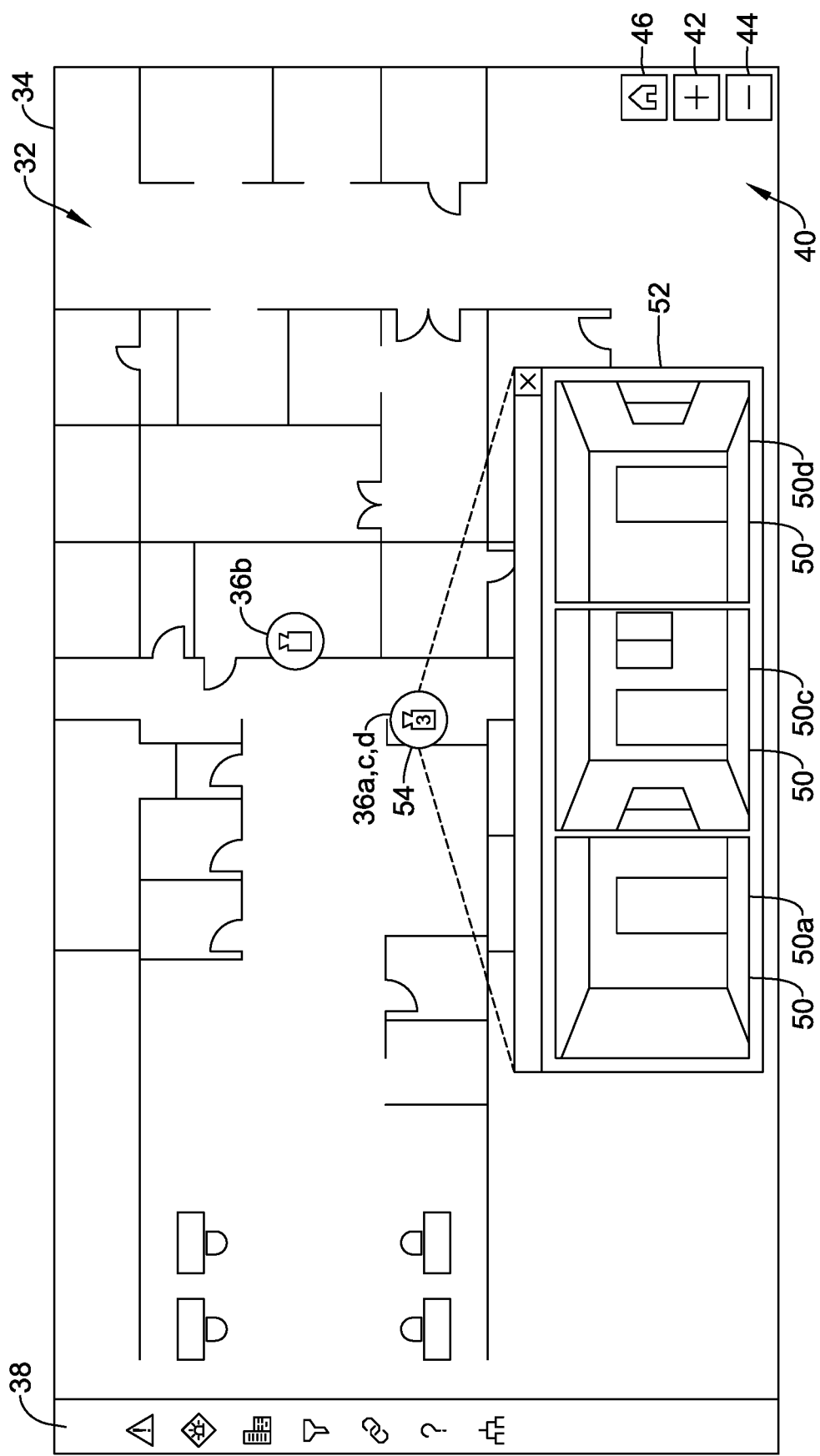
FIG. 7 is a schematic diagram of an illustrative display depicting a map with locations of building automation devices each marked with a corresponding icon, and a group pop-up window associated with multiple icons.

FIG. 7 depicts the map 32 and the camera icons 36 at a similar zoom level to that depicted in FIG. 4, where video streams 50 from cameras 12 associated with overlapping the pop-up windows 48 (not shown in FIG. 7) are combined into a single, combined or grouped pop-up window 52. Using the example of FIG. 4, where three pop-up windows 48 are overlapping, the first pop-up window 48a associated with the first camera icon 36a, the second pop-up window 48c associated with the third camera icon 36c, and the third pop-up window 48d associated with the fourth camera icon 36d depicted in FIG. 4 have been adjusted (e.g., removed and are not shown in FIG. 7) such that video streams 50 (e.g., a first video stream 50a, a second video stream 50c, and a third video stream 50d, respectively) from cameras 12 associated with the first pop-up window 48a, the second pop-up window 48c, and the third pop-up window 48d are provided in the grouped pop-up window 52. Although all three video streams from cameras 12 associated with the selected camera icons 36 have been combined into the grouped pop-up window 52 in FIG. 7, less than all of the video streams 50 associated with selected camera icons 36 may be combined into the grouped pop-up window 52 if it will result in displaying the video streams 50 without overlap of any pop-up windows 48, 52 with another pop-up window 48, 52. Additionally or alternatively, two or more grouped pop-up windows 52 may be utilized to group video streams 50 from cameras 12 associated with selected camera icons 36. Further, although three video streams 50 are shown combined into the grouped pop-up window 52, any suitable number of video streams 50 may be combined into grouped pop-up windows 52 to ensure pop-up windows 48 avoid overlap with other pop-up windows 48.

The grouping of video streams 50 into one or more grouped pop-up windows 52 may be based on any suitable factor(s). In some cases, the grouping of video streams 50 into single, grouped pop-up windows 52 may be based on a location of cameras 12 associated with the video streams 50, a location of the camera icons 36 associated with the video streams 50, the content of the video streams 50, the number of overlapping pop-up windows 48, and/or other suitable considerations. Although not depicted, the grouped pop-up windows 52 may include controls for control videos therein simultaneously (e.g., time-synced, etc.) and/or individually.

Further, although not required, when video streams 50 are combined into a single, combined pop-up window 52, the camera icons 36 associated with cameras 12 from which the video streams are provided may be combined into a combined camera icon 54. In some instances, as depicted in FIG. 7, the combined camera icon 54 may provide an indication of how many camera icons 36 having been combined into the single combined camera icon 54, which may correlate to the number of video streams 50 in the grouped pop-up window 52, but this is not required and not all camera icons 36 associated with the video streams 50 in the associated grouped pop-up window 52 are required to be combined into the single combined camera icon 54.

The combined camera icon 54 may be placed on the map 32 at any suitable location. For example, the combined camera icon 54 may be placed on the map 32 at an equidistance from each of the camera icons 36 combined into the combined camera icon 54, at a location of one of the camera icons 36 combined into the combined camera icon 54, and/or at one or more other locations on the map 32.

Figure 8:
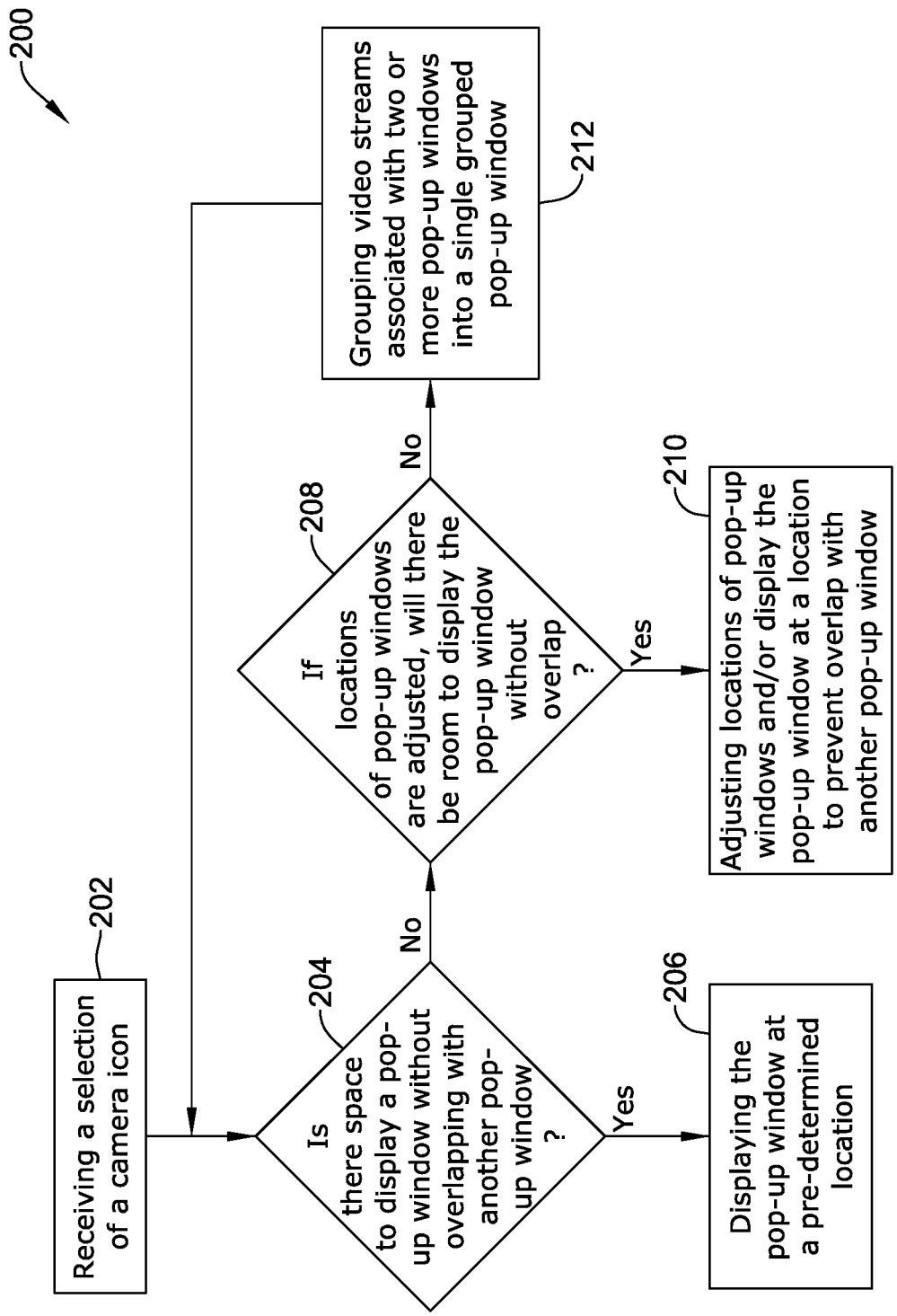
FIG. 8 is a schematic flow diagram of an illustrative method for displaying pop-up windows without overlapping the pop-up windows.

FIG. 8 is a schematic flow diagram of an illustrative method 200 of displaying pop-up windows on an electronic screen. One or more steps of the method 200 may be performed automatically by a computing device. In some cases, features of the method 200 may be performed automatically by a computing device in response to receiving 202 a selection of a camera icon (e.g., the camera icon 36 and/or other suitable camera icons) displayed on a map (e.g., the map 32 and/or other suitable map) of a predetermined area under surveillance by a surveillance system having cameras (e.g., the cameras 12 and/or other suitable cameras) associated with the camera icons.

In response to receiving the selection of a camera icon, it may be determined 204 whether there is enough display space on a screen (e.g., the electronic screen 34 and/or any other suitable screen) to display a pop-up window associated with the selected camera icon without the pop-up window overlapping with another already displayed pop-up window. Determining whether there is enough space to display the pop-up window associated with the selected icon may be performed in any manner discussed herein (e.g., as discussed above with respect to FIG. 5 and/or elsewhere herein) and/or any other suitable manner. When there is enough space to display the pop-up window associated with the selected camera icon on the map displayed on an electronic screen (e.g., the electronic screen 34 and/or other suitable electronic screen), the pop-up window may be displayed 206 at a predetermined location on the map.

When there is not enough space to display the pop-up window associated with the selected camera icon, it may be determined 208 whether adjusting locations of one or more of the pop-up windows will provide adequate room on the display to display the pop-up window without overlap of the pop-up windows. In determining whether adjusting locations of pop-up windows will result in enough space to display the pop-up window associated with the selected camera icon, adjusting locations of already displayed pop-up windows (e.g., already display individual pop-windows and/or grouped pop-up windows) and/or adjusting a predetermined location of the pop-window may be taken into account. If it is determined adjusting locations of pop-up windows may result in enough space to display the pop-up window on the screen without overlap of pop-up windows, then locations of one or both of one or more already displayed pop-up windows and the pop-up window associated with the selected camera icon may be adjusted 210 and the pop-up window associated with the selected camera icon may be displayed on the map along with the other pop-up windows (if any).

When it is determined that adjusting locations of pop-up windows will not provide enough room to display the pop-up window associated with the selected camera icon without overlap of the pop-up windows, videos streams (e.g., the video streams 50 and/or other suitable video streams) associated with two or more pop-up windows may be grouped 212 into a single, grouped pop-up window (e.g., the grouped pop-up window 52 and/or other grouped pop-up windows). After grouping two or more pop-up windows into the single, grouped pop-up window, the method 200 may return to determining 204 if there is enough space to display the pop-up window associated with the selected camera icon, as depicted in FIG. 8. Alternatively, the method 200 may repeat grouping 212 two or more pop-up windows into one or more grouped pop-up windows until there is enough space to display the pop-up window associated with the selected camera icon without overlapping pop-up windows.

Any suitable technique may be utilized for determining which two video streams to group into the single, grouped pop-up window. In one example of determining which video streams to group into the single, grouped pop-up window, map locations of selected camera icons associated with the pop-up windows already displayed and/or to-be display may be determined or identified and a measure of distance between each of the selected camera icons may be determined. Then, the two selected camera icons that are nearest each other may be identified and video streams associated with the two selected camera icons nearest each other may be grouped into a single, grouped pop-up window. In some cases, one or both of the nearest two selected camera icons may be already associated with a single, grouped pop-up window and in such circumstances, the video streams of the single, grouped pop-up window may be grouped with the video stream(s) associated with the nearest camera icon.

Figure 9:
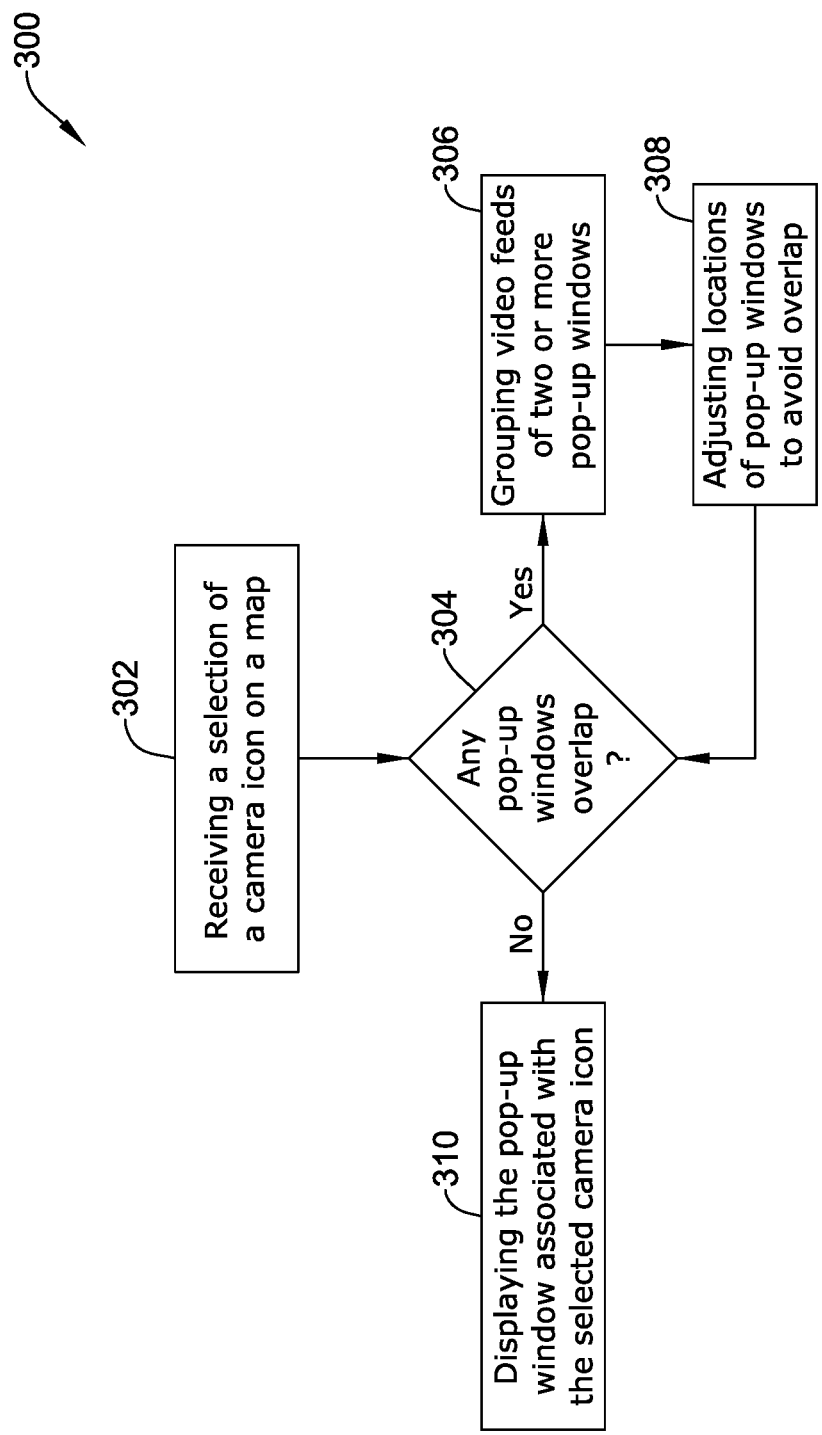
FIG. 9 is a schematic flow diagram of an illustrative method of positioning pop-up windows on a display.

FIG. 9 is a schematic flow diagram of an illustrative method 300 of displaying and/or positioning pop-up windows on an electronic screen. One or more steps of the method 300 may be performed automatically by a computing device. In some cases, features of the method 300 may be performed automatically by a computing device in response to receiving 302 a selection of a camera icon (e.g., the camera icon 36 and/or other suitable camera icons) displayed on a map (e.g., the map 32 and/or other suitable map) of a predetermined area under surveillance by a surveillance system having cameras (e.g., the cameras 12 and/or other suitable cameras) associated with the camera icons.

In response to receiving 302 the selection of the camera icon, it may be determined 304 whether there is enough space to display a pop-up window associated with the selected camera icon without the pop-up window overlapping with another already displayed pop-up window. Determining whether there is enough space to display the pop-up window associated with the selected icon may be performed in any manner discussed herein (e.g., as discussed above with respect to FIG. 5 and/or elsewhere herein) and/or any other suitable manner. When there is enough space to display the pop-up window associated with the selected camera icon on the map displayed on an electronic screen (e.g., the electronic screen 34 and/or other suitable electronic screen), displaying 310 the pop-up window associated with the selected camera icon.

When there is not enough space to display the pop-up window associated with the selected camera icon, videos streams (e.g., the video streams 50 and/or other suitable video streams) associated with two or more pop-up windows may be grouped 212 into a single, grouped pop-up window (e.g., the grouped pop-up window 52 and/or other grouped pop-up windows) based on relative distances between camera icons. In one example, video streams associated with the two closest camera icons on the map may be grouped into a single, grouped camera icon. Other suitable techniques may be utilized to group video streams into a single, grouped pop-up window, as desired.

Once the two video streams have been grouped together, locations of one or more already displayed and/or to-be displayed pop-up windows may be adjusted to avoid overlap of pop-up windows. After grouping pop-up windows and adjusting locations of pop-up windows, it may be further determined 304 whether any pop-up windows do or will overlap. If the pop-up windows do or will overlap, features 306 and 308 may be repeated. If the pop-up windows will not overlap, the pop-up window associated with the selected camera icon may be displayed 310.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of displaying video on a display, the method comprising:

displaying a map of a predetermined area on the display, the map including a plurality of icons, wherein each icon represents a corresponding video camera in the predetermined area and each icon is positioned at a map location that corresponds to a physical location of the corresponding video camera in the predetermined area;

receiving a selection by a user of two or more of the plurality of icons;

in response to receiving the selection by the user of the two or more of the plurality of icons, displaying a pop-up video stream window on the display for each of the selected two or more icons, wherein each of the pop-up video stream windows displays a video stream of the corresponding video camera; and wherein when two or more of the pop-up video stream windows would overlap one another on the display, grouping two or more of the video streams from the pop-up video stream windows that would overlap one another into a single grouped pop-up video stream window.

2. The method of claim 1, further comprising:

in response to receiving the selection by the user of the two or more of the plurality of icons, determining whether there is enough space to display the pop-up video stream windows for each of the selected two or more icons without overlapping one another;

when it is determined that there is enough space to display the pop-up video stream windows for each of the selected two or more icons without overlapping one another, displaying the pop-up video stream windows for each of the selected two or more icons in a non-overlapping manner; and when it is determined that there is not enough space to display the pop-up video stream windows for each of the selected two or more icons without overlapping one another, grouping two or more of the video stream from the pop-up video stream windows that would overlap one another into a single grouped pop-up video stream window.

3. The method of claim 1, further comprising:
in response to receiving the selection by the user of the two or more of the plurality of icons, determining whether there is enough space to display the pop-up video stream windows for each of the selected two or more icons without overlapping one another;
when it is determined that there is enough space to display the pop-up video stream windows for each of the selected two or more icons without overlapping one another, displaying the pop-up video stream windows for each of the selected two or more icons in a non-overlapping manner; and
when it is determined that there is not enough space to display the pop-up video stream windows for each of the selected two or more icons without overlapping one another, determining whether moving one or more pop-up video stream windows would avoid overlapping two or more of the pop-up video stream windows.

4. The method of claim 3, further comprising:
when it is determined that moving the location of one or more pop-up video stream windows would avoid overlapping two or more of the pop-up video stream windows, moving a location of the one or more pop-up video stream windows and displaying the two or more of the pop-up video stream windows in a non-overlapping manner; and
when it is determined that moving the location of one or more pop-up video stream windows would not avoid overlapping two or more of the pop-up video stream windows, grouping two or more of the video streams from the pop-up video stream windows that would overlap one another into a single grouped pop-up video stream window.

5. The method of claim 1, further comprising:
when it is determined that moving the location of one or more pop-up video stream windows would not avoid overlapping two or more of the pop-up video stream windows, determining which of the pop-up video stream windows to combine into the single grouped pop-up video stream window.

6. The method of claim 5, wherein determining which video streams to combine into the single grouped pop-up video stream window comprises:
determining map locations of two or more of the selected icons;
determining a measure of distance between each of the two or more selected icons;
identifying two of the selected icons that are nearest each other; and
grouping video streams represented by the two icons identified as being nearest each other into the single grouped pop-up video stream window.

7. The method of claim 6, wherein determining which video streams to combine into the single grouped pop-up video stream window further comprises:
determining when two or more pop-up video stream windows including the single grouped pop-up video stream window would overlap after the video streams represented by the two icons identified as being nearest each other are grouped into the single grouped pop-up video stream window;
when it is determined that two or more pop-up video stream windows including the single grouped pop-up video stream window would overlap after grouping the video streams of the two icons identified as being nearest each other into the single grouped pop-up video stream window:
determining distances between each of the two or more selected icons that are not grouped into the single grouped pop-up video stream window;
identifying two icons that are not grouped into the single grouped pop-up video stream window that are nearest each other; and
grouping video streams represented by the two icons that are not grouped into the single grouped pop-up video stream window that are nearest each other into another single grouped pop-up video stream window.

8. The method of claim 6, wherein determining which video streams to combine into the single grouped pop-up video stream window further comprises:
grouping the two icons identified as being nearest each other in a single group icon.

9. The method of claim 8, wherein determining which video streams to combine into the single grouped pop-up video stream window further comprises:
determining when two or more pop-up video stream windows would overlap after the video streams represented by the two icons identified as being nearest each other are grouped into the single grouped pop-up video stream window and the two icons identified as being nearest each other are grouped into the single group icon;
when it is determined that two or more pop-up video stream windows including the single grouped pop-up video stream window would overlap after grouping the video streams represented by the two icons identified as being nearest each other into the single grouped pop-up video stream window and grouping the two icons identified as being nearest each into the single group icon:
determining distances between each of two or more selected icons, including the single group icon, that are nearest each other; and
grouping video streams represented by the two icons, including the single group icon, that are nearest each other into one of the single grouped pop-up video stream window and another single grouped pop-up video stream window.

10. The method of claim 1, further comprising:
grouping the icons representing the two or more video streams grouped in the single grouped pop-up video stream window into a single group icon.

11. The method of claim 1, further comprising:
determining when two or more of the pop-up video stream windows would overlap one another on the display by:
comparing a number of pop-up video stream windows to be displayed to a threshold number of pop-up video stream windows;
when the number of pop-up video stream windows to be displayed reaches or goes beyond the threshold number of pop-up video stream windows, determining two or more pop-up video stream windows would overlap; and
when the number of pop-up video stream windows to be displayed has not reached the threshold number of pop-up video stream windows, determining two or more pop-up video stream windows can be displayed without overlapping.

12. The method of claim 11, wherein the map has an adjustable zoom level and the threshold number of pop-up video stream windows is a function of the adjustable zoom level.

13. The method of claim 1, further comprising:
determining whether two or more pop-up video stream windows would overlap, wherein the determining whether two or more pop-up video stream windows would overlap comprises:
 determining whether two or more pop-up video stream windows would have one or more pixels of the display in common;
 when two or more pop-up video stream windows are determined to have one or more pixel of the display in common, determining two or more pop-up video stream windows would overlap; and
 when two or more pop-up video stream windows are determined to not have one or more pixels of the display in common, determining two or more pop-up video stream windows can be displayed without overlapping.

14. A computer readable medium having stored thereon in a non-transitory state a program code for use by a computing device, the program code causing the computing device to execute a method for displaying video on a display comprising:
displaying a plurality of icons on a map of a predetermined area, each icon represents a corresponding video camera in the predetermined area and each icon is positioned at a map location that corresponds to a physical location of the corresponding video camera in the predetermined area;
displaying a video stream window on a display for each of two or more of the plurality of displayed icons, each video stream window is configured to display a video stream from the corresponding video camera represented by the icon;
when two or more of the video stream windows are to be displayed and two or more of the video stream windows would overlap:
 determining when adjusting a location on the display of one or more of the two or more video stream windows to be displayed would avoid overlap of any of the two or more video stream windows to be displayed;
 if adjusting locations on the display of one or more video stream windows would avoid overlap of at least two or more video stream windows, adjust the locations on the display of the one or more video stream windows; and
 if adjusting locations on the display of the one or more video stream windows would not avoid all overlap of the two or more video stream windows to be displayed, grouping two or more of the video streams in a single video stream window to prevent overlap of the two or more video stream windows that would have overlapped.

15. The computer readable medium of claim 14 further comprising:
determining whether two or more video stream windows would overlap, wherein determining whether two or more video stream windows would overlap comprises:
 comparing a number of video stream windows to be displayed to a threshold number of video stream windows;
 when the number of video stream windows to be displayed reaches or goes beyond the threshold number of video stream windows, determining two or more video stream windows would overlap; and
 when the number of video stream windows to be displayed has not reached the threshold number of video stream windows, determining two or more video stream windows can be displayed without overlapping.

16. The computer readable medium of claim 15, wherein the map has an adjustable zoom level and the threshold number of video stream windows is a function of the adjustable zoom level.

17. The computer readable medium of claim 14, further comprising:
determining whether two or more video stream windows would overlap, wherein determining whether two or more video stream windows would overlap comprises:
 determining whether two or more video stream windows would have one or more pixels of the display in common;
 when two or more video stream windows are determined to have one or more pixel of the display in common, determining two or more video stream windows would overlap;
 when two or more video stream windows are determined to not have one or more pixels of the display in common, determining two or more video stream windows can be displayed without overlapping.

18. The computer readable medium of claim 14, further comprising:
grouping the icons representing the two or more video streams grouped in the single video stream window in a single group icon.

19. A video monitoring system comprising:
a display;
a processor in communication with the display and configured to receive video streams from two or more video cameras;
memory configured to store instruction executable by the processor to:
 display a map of a predetermined area, the map including icons indicating locations of the two or more video cameras in the predetermined area;
 display the video streams received from the two or more video cameras in video stream windows on the display;
ensure the video stream windows displayed on the display avoid overlap;
wherein, when two or more of the video stream windows are to be displayed and two or more of the video stream windows would overlap:
 determine if adjusting a location on the display of one or more of the two or more video stream windows to be displayed would avoid overlap of any of the two or more video stream windows to be displayed;
 if adjusting locations on the display of one or more video stream windows would avoid overlap of at least two or more video stream windows, adjust the locations of the one or more video stream windows; and
 if adjusting locations of one or more video stream windows would not avoid all overlap of the two or more video stream windows to be displayed, group two or more of the video streams in a single video stream window to prevent overlap of the two or more video stream windows that would have overlapped after adjustment of the locations of the one or more video stream windows.

\* \* \* \* \*